United States Patent
Wein et al.

(10) Patent No.: US 11,267,344 B2
(45) Date of Patent: Mar. 8, 2022

(54) BRAKE SYSTEM FOR AN AT LEAST PARTLY ELECTRICALLY POWERED VEHICLE, MOTOR VEHICLE WITH SUCH A BRAKE SYSTEM, AND BRAKE CONTROL METHOD

(71) Applicant: AUDI AG, Ingolstadt (DE)

(72) Inventors: Michael Wein, Seubersdorf (DE); Matthias Geuß, Breitengüßbach (DE)

(73) Assignee: AUDI AG, Ingolstadt (DE)

(*) Notice: Subject to any disclaimer, the term of this patent is extended or adjusted under 35 U.S.C. 154(b) by 280 days.

(21) Appl. No.: 16/593,245

(22) Filed: Oct. 4, 2019

(65) Prior Publication Data

US 2020/0108723 A1    Apr. 9, 2020

(30) Foreign Application Priority Data

Oct. 8, 2018 (DE) .................. 102018217142.4

(51) Int. Cl.
     *B60L 7/26*      (2006.01)
     *B60L 7/00*      (2006.01)
     *B60L 7/18*      (2006.01)
     *B60W 30/18*     (2012.01)

(52) U.S. Cl.
     CPC ............. *B60L 7/26* (2013.01); *B60L 7/00* (2013.01); *B60L 7/18* (2013.01); *B60W 30/18109* (2013.01); *B60W 2710/18* (2013.01)

(58) Field of Classification Search
     CPC .... B60L 7/26; B60L 7/18; B60L 7/00; B60W 30/18109; B60W 2710/18
     See application file for complete search history.

(56) References Cited

U.S. PATENT DOCUMENTS

| 2011/0040465 | A1 | 2/2011 | Suda | |
| 2012/0136547 | A1* | 5/2012 | Miyazaki | B60T 8/4081 |
| | | | | 701/70 |
| 2014/0207355 | A1* | 7/2014 | Akaho | B60T 8/17616 |
| | | | | 701/71 |
| 2018/0361856 | A1* | 12/2018 | Zhao | B60W 10/10 |

FOREIGN PATENT DOCUMENTS

| DE | 4435953 | A1 | 5/1995 |
| DE | 102010027348 | A1 | 8/2011 |
| DE | 102012210046 | A1 | 12/2013 |
| DE | 102012214985 | A1 | 2/2014 |
| DE | 102013221979 | A1 | 4/2015 |

OTHER PUBLICATIONS

Examination Report dated Sep. 4, 2019 in corresponding German application No. 102018217142.4; 20 pages.

* cited by examiner

*Primary Examiner* — James M McPherson
*Assistant Examiner* — Kyle J Kingsland
(74) *Attorney, Agent, or Firm* — Maier & Maier, PLLC

(57) ABSTRACT

A brake system for an at least partly electrically powered vehicle having an electric motor operable as a generator; a friction brake device; a brake control device, which is designed to regulate a generator torque (MGE) of the generator and a friction braking torque (MRB) of the friction brake device; an operating element, especially a brake pedal or brake lever or accelerator pedal, which is designed to provide a desired deceleration.

5 Claims, 2 Drawing Sheets

A)

B)

C)

D)

BRAKE SYSTEM FOR AN AT LEAST PARTLY ELECTRICALLY POWERED VEHICLE, MOTOR VEHICLE WITH SUCH A BRAKE SYSTEM, AND BRAKE CONTROL METHOD

FIELD

The disclosure relates to a brake system for an at least partly electrically powered vehicle, a motor vehicle with such a brake system, and a brake control method for such a brake system.

BACKGROUND

In currently available electrically powered vehicles, such as hybrid vehicles or electric vehicles, the vehicle can be decelerated by using electric motors, which are operated as a generator, and/or by the friction brake.

If a certain desired deceleration or target deceleration (M_tar) needs to be achieved in such a vehicle, being dictated by an operating element, such as a brake pedal or a brake lever, this can be done by any desired combination of generator torque (M_GE) and friction braking torque (M_RB), the total being constant, as can be seen from the following equation (1):

$$M\_tar = M\_GE + M\_RB \qquad (1)$$

Usually, for efficiency reasons, deceleration is done at first or primarily with the generator. Only in certain situations, for example in the standstill range or with imminent driving instability (engaging of an ABS system or an ESP system), will the generator torque be reduced and replaced by the friction braking torque. This process of the transition from an operating generator torque to a friction braking torque or vice versa is known a blending in such brake systems.

The torque provided by the generator is limited. The torque of the friction brake device, on the other hand, is in every instance significantly larger than the maximum generator torque. One may also say that the torque of the friction brake device is unlimited as compared to the generator torque. Therefore, the generator torque (M_GE) is usually calculated first and the friction braking torque (M_RB) results from the difference between the total desired or target deceleration (M_tar) and the generator torque (M_GE), as can be seen from the following equation (2):

$$M\_RB = M\_tar - M\_GE \qquad (2)$$

Such a blending usually occurs with a certain gradient. Therefore, a generator gradient is set for the generator (dM_GE=dM_GE_vorgabe). From this, the following gradient results for the friction brake device (derivative of (2)):

$$dM\_RB = dM\_tar - dM\_GE\_vorgabe \qquad (3)$$

In vehicles which are at least partly or temporarily electrically powered, one must take into consideration that the generator may experience significantly higher gradients than the friction brake device. This is especially due to the fact that the friction brake device is activated by corresponding actuators, such as electric motors, pumps, and the like, which may usually cause acoustics and comfort problems when a steep gradient is set.

The above indicated known method can be summarized as follows: for such a brake system we have the generator with limited torque and the friction brake device with limited gradient demand, i.e., the gradient to be adjusted by means of the friction brake device should neither be too high nor too low. If the operating element (brake pedal) of the brake system is held constant, i.e., the gradient of the desired deceleration dM_tar amounts to zero, one gets from the above formula (3) the gradient for the friction brake device as dM_RB=dM_GE_vorgabe. But if the operating element (brake pedal) is activated, especially by an additional or decreasing pressure on the brake pedal, the operating element will have a gradient. For given generator torque dM_GE_vorgabe, the gradient of the friction brake torque dM_RB will then necessarily deviate, because the desired deceleration torque (dM_tar) needs to be factored into the formula (3) when the operating element is activated.

This causes disadvantages, because the friction brake device has a gradient limitation. If the gradient of the friction braking torque (dM_RB) is greater than a gradient limitation, acoustics problems or comfort problems may occur, especially because when the gradient is too large for the friction brake device corresponding servo motors or hydraulic pumps need to be driven intensively, which can be perceived acoustically by the driver and may be experienced as annoying. If the gradient of the friction braking torque (dM_RB) is less than the gradient limitation, the brake system as a whole does not work efficiently, because the friction brake device is not activated adequately or is too slow.

SUMMARY

The problem which the invention proposes to solve is therefore to provide a brake system in which the above drawbacks can be avoided.

Thus, a brake system is proposed for an at least partly electrically powered vehicle having:
an electric motor operable as a generator;
a friction brake device;
a brake control device, which is designed to regulate a generator torque of the generator and a friction braking torque of the friction brake device;
an operating element, especially a brake pedal or brake lever or accelerator pedal, which is designed to provide a desired deceleration;
a sensor device, which is designed to detect, in dependence on a detected activation of the operating element, a desired deceleration torque and its desired deceleration gradients,
wherein the brake control device is designed to distribute a friction braking torque on the friction brake device and/or a generator torque on the generator such that the sum of the friction braking torque and the generator torque substantially corresponds to the desired deceleration torque. It is proposed that the brake control device is further designed, in dependence on a detected activation of the operating element:
to set the friction braking torque or its friction braking gradients,
to set the generator torque or its generator gradients, and
to adapt the generator torque or its generator gradients as needed and in dependence on the desired deceleration torque or its desired deceleration gradients so that the friction braking torque or its friction braking gradient remains constant.

Thus, in such a brake system, the gradient for the friction brake device can be set directly and always be adjusted as desired. Accordingly, boundary conditions for acoustics, comfort and the like can be observed, because the gradient of the friction brake device is not greater than is permitted.

Moreover, the brake system is overall efficient at all times, because the gradient of the friction brake device is not slower than is necessary.

The indicated brake system can be implemented specifically as follows. The generator torque or its generator gradient can be given or selected as follows:

$$dM\_GE\_vorgabe = dM\_tar - dM\_RB\_vorgabe \quad (4)$$

By inserting this equation (4) into the equation (3) already mentioned above, we get the desired gradient dM_RB=dM_RB_vorgabe for the friction braking torque.

Accordingly, the generator torque or its generator gradient (dM_GE_vorgabe) may then be adapted as needed and in dependence on the desired deceleration torque or its desired deceleration gradients (dM_tar) so that the friction braking torque or its friction braking gradient remains constant, i.e., corresponds to the set quantity dM_RB_vorgabe.

The brake control device may further be designed to filter and/or to weight the desired deceleration gradients. In this way, the efficiency of the brake system can be improved overall and different scenarios during braking processes can be adequately simulated and implemented.

The brake control device may further be designed to adapt the generator gradients with friction braking gradients remaining constant:
a) in a transition from the friction brake device to the generator: increase the generator gradient with increasing desired deceleration torque;
b) in a transition from the friction brake device to the generator: decrease the generator gradient with decreasing desired deceleration torque;
c) in a transition from the generator to the friction brake device: decrease the value of the generator gradient with increasing desired deceleration torque;
d) in a transition from the generator to the friction brake device: increase the value of the generator gradient with decreasing desired deceleration torque.

In this way, it is possible for the brake system to work in optimized manner and for the transition from one braking component to the other, especially the blending between generator and friction brake device, to occur in every instance efficiently and unnoticed by the driver or passenger of the vehicle.

For the solution of the above mentioned problem, there is also proposed a motor vehicle having at least one electric motor, which is designed to generate propulsive forces or deceleration forces acting on at least one wheel of the motor vehicle, wherein the motor vehicle comprises a brake system as described above.

Such a motor vehicle may be a hybrid vehicle or a purely electrically powered vehicle.

Moreover, a control method for a brake system of an at least partly electrically powered vehicle is also proposed, wherein the brake system comprises an electric motor operable as a generator, a friction brake device, an operating element and a brake control device, wherein the method involves the following steps:
detecting a desired deceleration torque and its desired deceleration gradients as requested by means of the operating element;
distributing a friction braking torque on the friction brake device and/or a generator torque on the generator such that the sum of the friction braking torque and the generator torque substantially corresponds to the desired deceleration torque;
in dependence on a detected activation of the operating element:
setting the friction braking torque or its friction braking gradients;
setting the generator torque or its generator gradients; and
adapting as needed the generator torque or its generator gradients in dependence on the desired deceleration torque or its desired deceleration gradients so that the friction braking torque or its friction braking gradient remains constant.

Further optional steps of the method may be deduced from the above described features of the brake system. The equations given may also be part of the method carried out.

Regarding the desired deceleration torque to be applied, it is pointed out that it may also easily deviate from the calculated sum of the friction braking torque and the generator torque, the deviation being such that the driver does not notice this deviation. In other words, the sum of the friction braking torque and the generator torque may thus correspond exactly to the desired deceleration torque or correspond to roughly 80 to 120%, especially 90% to 110%, of the desired deceleration torque.

BRIEF DESCRIPTION OF THE DRAWINGS

Further benefits, features and details of the invention will emerge from the patent claims, the following description of preferred embodiments, and the drawings. There are shown:

DETAILED DESCRIPTION

Figure 1:
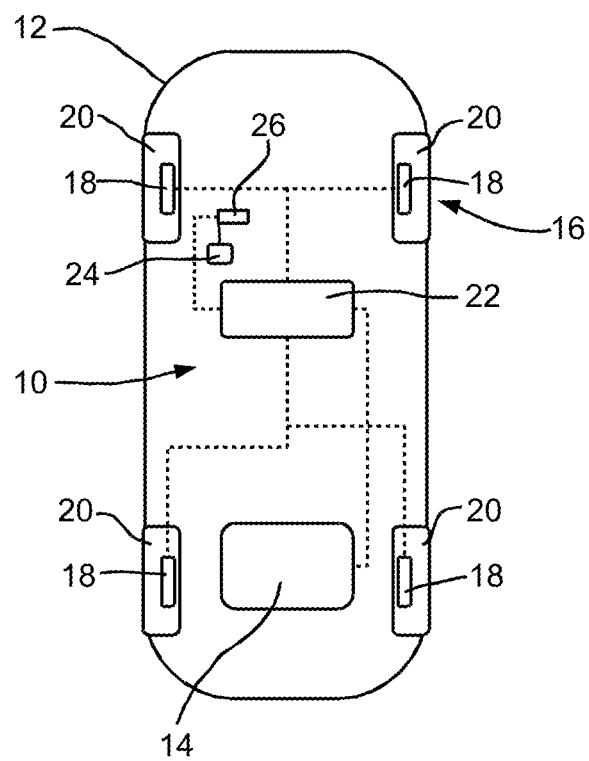
FIG. 1 a simplified and schematic representation of a brake system in a motor vehicle.

FIG. 1 shows in a schematic and simplified representation a brake system 10 for an at least partly electrically powered vehicle 12. The brake system 10 comprises an electric motor 14 operable as a generator and a friction brake device 16. The friction brake device in this example comprises four friction brakes 20 acting on individual wheels 18 of the vehicle 12. The friction brakes 20 may be disk brakes or drum brakes. Each friction brake 18 may be coordinated with corresponding actuating means, especially electrically operated servo motors and/or electrically operated hydraulic pumps, in order to generate a suitable brake pressure for the friction braking torque to be achieved.

The brake system 10 further comprises a brake control device 22, which is designed to regulate a generator torque of the generator 14 and a friction braking torque of the friction brake device 16. Moreover, the brake system 10 comprises an operating element 24, embodied for example as a brake pedal or brake lever and designed to set a desired deceleration when activated by the driver of the vehicle 12. The operating element 24 may also be an accelerator pedal, especially an accelerator pedal of an electric vehicle. In such an accelerator pedal, for example, the relaxing of the activation can be detected and a desired deceleration torque can be ascertained from this.

A sensor device 26 of the brake system 12 is designed to detect a desired deceleration torque and its desired deceleration gradient in dependence on a detected activation or decreasing activation of the operating element 24. The information detected by the sensor device 26 or the detected signals are transmitted to the brake control device 22.

The brake control device 22 of the brake system 10 is designed to distribute a friction braking torque on the friction brake device 16 and/or a generator torque on the generator 14 so that the sum of the friction braking torque and the generator torque corresponds to the desired deceleration torque.

Figure 2:
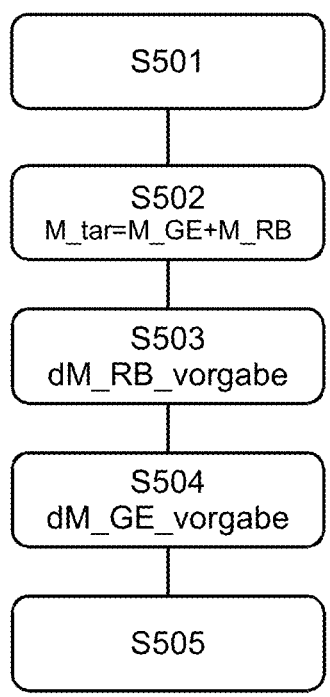
FIG. 2 a simplified and schematic representation of a control system for a brake system.

A control method for a brake system 10 is shown in simplified and exemplary manner in FIG. 2. In a step S501, a requested desired deceleration torque and its desired deceleration gradient is detected by means of the operating element 24. According to a step S502, a friction braking torque is distributed on the friction brake device 16 and/or a generator torque is distributed on the generator 14 in such a way that the sum of the friction braking torque and the generator torque corresponds to the desired deceleration torque. This is illustrated by the equation (1) represented in step S502 (see the introduction to the specification).

In dependence on the detected activation of the operating element 24, the friction braking torque or its friction braking gradient is set in the method, as represented by step S503. In a step S504, the generator torque or its generator gradient is likewise set. If a gradient occurs for the desired deceleration torque during the braking process being carried out, in step S505 the generator torque or its generator gradient is adapted as needed in dependence on the desired deceleration torque or its desired deceleration gradient, the friction braking torque or its friction braking gradient remaining constant.

The brake system 10 presented here may be in particular a so-called by-wire brake system, in which the operating element 24 has no direct mechanical or hydraulic connection to the friction brake device 16, but instead only the distance and/or the pressure is detected in a simulator (elastic element which is deformed upon braking) of the operating element and the required variables for the braking process are ascertained from this detected distance data (activation of the operating element).

Figure 3:
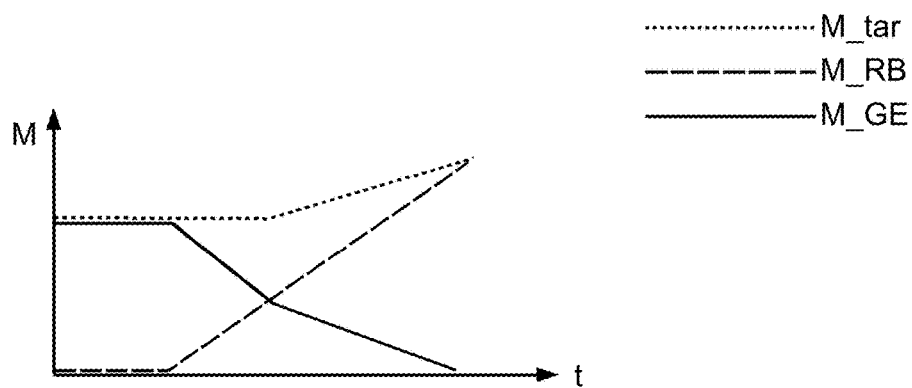
FIG. 3 four exemplary and simplified diagrams illustrating the relationship between desired deceleration torque, friction braking torque and generator torque of the brake system.
Figure 3:
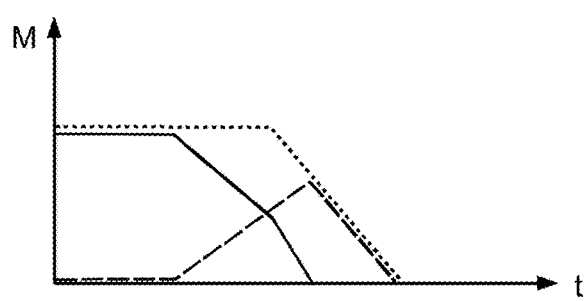
Figure 3:
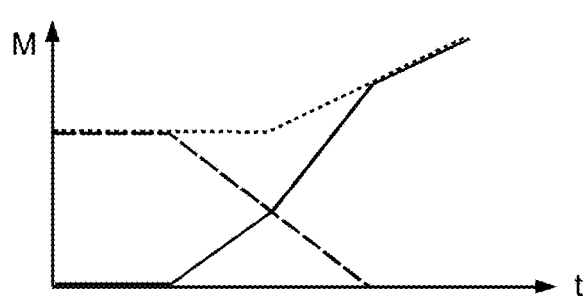
Figure 3:
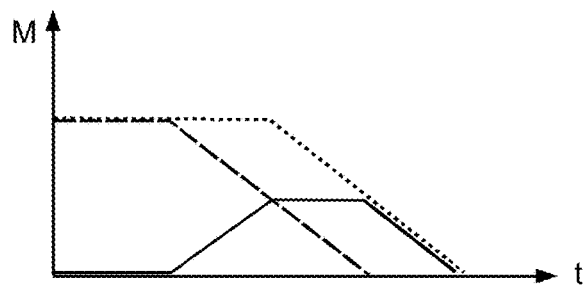

FIG. 3 shows in A) to D) the example of four cases in which the set generator torque (M_GE) or generator gradient (dM_GE_vorgabe) is adapted under respectively varying desired deceleration torque (M_tar) and varying desired deceleration gradients (dM_tar), with the set friction braking torque (M_RB) and friction braking gradient (dM_RB_vorgabe) remaining constant. The representation by the different lines for the different torques is purely qualitative and serves only as an illustration.

Example A) shows the braking of a vehicle to standstill. Here, in a transition from the generator to the friction brake device, the value of the generator gradient is decreased with increasing desired deceleration torque.

In example A), the operating element (brake pedal) is activated more strongly after an initially constant position. At first, the desired deceleration is provided solely by the generator torque and the friction braking torque is set at zero or almost zero. Once the friction braking torque begins to work with constant friction braking gradient, the generator torque diminishes in a corresponding degree, in order to achieve the desired deceleration torque. The friction braking torque or its friction braking gradient is maintained constant until standstill, with only the friction brake still working, since the generator is at rest, while the generator gradient is adapted such that the generator torque has decreased to zero until standstill, but the altered desired deceleration torque is achieved.

Example B) shows a braking with subsequent releasing of the activation of the operating element or also a braking of the vehicle to standstill. Here, in a transition from the generator to the friction brake device, the value of the generator gradient is increased with decreasing desired deceleration torque.

In example B), the operating element (brake pedal) is activated less or not at all after an initially constant position. At first, the desired deceleration is provided solely by the generator torque and the friction braking torque is set at zero or almost zero. After relaxing the activation of the operating element, by which the desired deceleration torque drops to zero, an adapted (increased) easing up occurs for the generator torque with constant easing up of the friction braking torque.

Examples A and B respectively show, e.g., a braking at standstill, e.g., before a traffic light. In example A, the driver steps on the brake (since he initially estimated too short a braking distance), in example B the driver eases up on the pedal (he initially estimated the distance too large). The respective blending process in examples A and B occurs because the generator in standstill cannot deliver any braking torque.

Examples C) and D) show so-called return blending processes, in which the friction brake device at first works by itself and further adaptations to an altered desired deceleration torque are achieved by adapting the generator torque under constant relaxed friction braking torque.

In particular, in example C) in a transition from the friction brake device to the generator, the generator gradient is increased with increasing desired deceleration torque.

In example D), in a transition from the friction brake device to the generator, the generator gradient is decreased with decreasing desired deceleration torque.

The invention claimed is:

1. A brake system for an at least partly electrically powered vehicle comprising:
    an electric motor operable as a generator;
    a friction brake device; a brake control device, which is designed to regulate a generator torque (M_GE) of the generator and a friction braking torque (M_RB) of the friction brake device;
    an operating element which is designed to provide a desired deceleration (M_tar);
    a sensor device, which is designed to detect, in dependence on a detected activation of the operating element, a desired deceleration torque (M_tar) and its desired deceleration gradients (dM_tar),
    wherein the brake control device is designed to distribute a friction braking torque (M_RB) on the friction brake device and/or a generator torque (M_GE) on the generator such that the sum of the friction braking torque (M_RB) and the generator torque (M_GE) substantially corresponds to the desired deceleration torque (M_tar), wherein the brake control device is further designed, in dependence on a detected actuation of the operating element:
    to set the friction braking torque (M_RB) or its friction braking gradients (dM_RB_vorgabe),
    to set the generator torque (M_GE) or its generator gradients (dM_GE_vorgabe), and
    to adapt the generator torque (M_GE) or its generator gradients (dM_GE_vorgabe) as needed and in dependence on the desired deceleration torque (M_tar) or its desired deceleration gradients (dM_tar) so that the friction braking torque (M_RB) or its friction braking gradient (dM_RB_vorgabe) remains constant, wherein the brake control device is further designed to adapt the generator gradients (dM_GE_vorgabe) with friction braking gradients (dM_RB_vorgabe) remaining constant:
  a) in a transition from the friction brake device to the generator: increase the generator gradient (dM_GE_vorgabe) with increasing desired deceleration torque (M_tar);
  b) in a transition from the friction brake device to the generator: decrease the generator gradient (dM_GE_vorgabe) with decreasing desired deceleration torque (M_tar);
  c) in a transition from the generator to the friction brake device: decrease the value of the generator gradient (dM_GE_vorgabe) with increasing desired deceleration torque (M_tar); and
  d) in a transition from the generator to the friction brake device: increase the value of the generator gradient (dM_GE_vorgabe) with decreasing desired deceleration torque (M_tar).

2. The brake system according to claim 1, wherein the brake control device is further designed to filter and/or to weight the desired deceleration gradients (dM_tar).

3. A motor vehicle comprising:
  at least one electric motor, which is designed to generate propulsive forces or deceleration forces acting on at least one wheel of the motor vehicle,
  wherein the motor vehicle comprises a brake system for an at least partly electrically powered vehicle that comprises,
  an electric motor operable as a generator;
  a friction brake device;
  a brake control device, which is designed to regulate a generator torque (M_GE) of the generator and a friction braking torque (M_RB) of the friction brake device;
  an operating element which is designed to provide a desired deceleration (M_tar);
  a sensor device, which is designed to detect, in dependence on a detected activation of the operating element, a desired deceleration torque (M_tar) and its desired deceleration gradients (dM_tar),
  wherein the brake control device is designed to distribute a friction braking torque (M_RB) on the friction brake device and/or a generator torque (M_GE) on the generator such that the sum of the friction braking torque (M_RB) and the generator torque (M_GE) substantially corresponds to the desired deceleration torque (M_tar), wherein the brake control device is further designed, in dependence on a detected actuation of the operating element:
  to set the friction braking torque (M_RB) or its friction braking gradients (dM_RB_vorgabe),
  to set the generator torque (M_GE) or its generator gradients (dM_GE_vorgabe), and
  to adapt the generator torque (M_GE) or its generator gradients (dM_GE_vorgabe) as needed and in dependence on the desired deceleration torque (M_tar) or its desired deceleration gradients (dM_tar) so that the friction braking torque (M_RB) or its friction braking gradient (dM_RB_vorgabe) remains constant,
  wherein the brake control device is further designed to adapt the generator gradients (dM_GE_vorgabe) with friction braking gradients (dM_RB_vorgabe) remaining constant:
  a) in a transition from the friction brake device to the generator: increase the generator gradient (dM_GE_vorgabe) with increasing desired deceleration torque (M_tar);
  b) in a transition from the friction brake device to the generator: decrease the generator gradient (dM_GE_vorgabe) with decreasing desired deceleration torque (M_tar);
  c) in a transition from the generator to the friction brake device: decrease the value of the generator gradient (dM_GE_vorgabe) with increasing desired deceleration torque (M_tar); and
  d) in a transition from the generator to the friction brake device: increase the value of the generator gradient (dM_GE_vorgabe) with decreasing desired deceleration torque (M_tar).

4. The motor vehicle according to claim 3, wherein the motor vehicle is a hybrid vehicle or a purely electrically powered vehicle.

5. A control method for a brake system of an at least partly electrically powered vehicle, wherein the brake system comprises:
  an electric motor operable as a generator, a friction brake device; an operating element and a brake control device, wherein the method involves the following steps:
  detecting a desired deceleration torque (M_tar) and its desired deceleration gradients (dM_tar) as requested by means of the operating element;
  distributing a friction braking torque (M_RB) on the friction brake device and/or a generator torque (M_GE) on the generator such that the sum of the friction braking torque (M_RB) and the generator torque (M_GE) substantially corresponds to the desired deceleration torque (M_tar);
  in dependence on a detected activation of the operating element:
  set the friction braking torque (M_RB) or its friction braking gradients (dM_RB_vorgabe);
  set the generator torque (M_GE) or its generator gradients (dM_GE_vorgabe); and
  adapt as needed the generator torque (M_GE) or its generator gradients (dM_GE_vorgabe) in dependence on the desired deceleration torque (M_tar) or its desired deceleration gradients (dM_tar) so that the friction braking torque (M_RB) or its friction braking gradient (dM_RB_vorgabe) remains constant,
  wherein the brake control device is further designed to adapt the generator gradients (dM_GE_vorgabe) with friction braking gradients (dM_RB_vorgabe) remaining constant:
  a) in a transition from the friction brake device to the generator: increase the generator gradient (dM_GE_vorgabe) with increasing desired deceleration torque (M_tar);
  b) in a transition from the friction brake device to the generator: decrease the generator gradient (dM_GE_vorgabe) with decreasing desired deceleration torque (M_tar);
  c) in a transition from the generator to the friction brake device: decrease the value of the generator gradient (dM_GE_vorgabe) with increasing desired deceleration torque (M_tar); and
  d) in a transition from the generator to the friction brake device: increase the value of the generator gradient (dM_GE_vorgabe) with decreasing desired deceleration torque (M_tar).

* * * * *